(12) United States Patent
Chan et al.

(10) Patent No.: US 10,133,769 B2
(45) Date of Patent: Nov. 20, 2018

(54) INTEGRATION DEVICE AND INTEGRATION METHOD THEREOF

(71) Applicant: Institute For Information Industry, Taipei (TW)

(72) Inventors: Kai-Hsuan Chan, Keelung (TW); Yan-Ming Chen, Tainan (TW); Chien-Yao Wang, New Taipei (TW)

(73) Assignee: Institute For Information Industry, Taipei (TW)

( * ) Notice: Subject to any disclaimer, the term of this patent is extended or adjusted under 35 U.S.C. 154(b) by 186 days.

(21) Appl. No.: 15/359,615

(22) Filed: Nov. 22, 2016

(65) Prior Publication Data

US 2018/0137160 A1 May 17, 2018

(30) Foreign Application Priority Data

Nov. 16, 2016 (TW) .............................. 105137456 A

(51) Int. Cl.
*G06F 17/30* (2006.01)
(52) U.S. Cl.
CPC .. *G06F 17/30368* (2013.01); *G06F 17/30554* (2013.01)
(58) Field of Classification Search
CPC ................................................ G06F 17/30368
See application file for complete search history.

(56) References Cited

U.S. PATENT DOCUMENTS

| 5,497,486 | A | * | 3/1996 | Stolfo | ........................ G06F 7/14 |
| 5,974,574 | A | * | 10/1999 | Lennie | ................ G06F 11/1451 |
| | | | | | 714/52 |
| 8,543,540 | B1 | * | 9/2013 | Wilson | .................. G06F 17/303 |
| | | | | | 707/626 |
| 8,671,073 | B2 | * | 3/2014 | Gonzalez | .......... G06F 17/30174 |
| | | | | | 707/610 |
| 8,700,569 | B1 | * | 4/2014 | Wilson | .................. G06F 17/303 |
| | | | | | 707/626 |
| 9,043,278 | B1 | * | 5/2015 | Wilson | .............. G06F 17/30575 |
| | | | | | 707/626 |
| 2006/0224638 | A1 | * | 10/2006 | Wald | ................. G06F 17/30377 |
| 2010/0223231 | A1 | * | 9/2010 | Lee | ................... G06F 17/30498 |
| | | | | | 707/610 |

\* cited by examiner

*Primary Examiner* — Mahesh H Dwivedi
(74) *Attorney, Agent, or Firm* — Skaar Ulbrich Macari, P.A.

(57) ABSTRACT

An integration device and an integration method thereof are provided. The integration device executes an artifact integration procedure to integrate the artifacts in a first database and the artifacts in the second database. Based on the access authority of each process role in the first database and the access authority of each process role added from the second database into the first database, the integration device further modifies a plurality of application programming interfaces associated with the integrated artifacts and modifies a plurality of processes according to the modified application programming interfaces. In addition, the integration device further executes a process role integration procedure to integrate the process roles of the first database and the process roles added from the second database into the first database.

20 Claims, 14 Drawing Sheets

```
<?xml version="1.0" encoding="UTF-8"?>                                    P1
<definitions...>
  <process id="process1" StarterUsers="administrator">
    <sequenceFlow id="A" sourceRef="Start" targetRef="E"><sequence Flow>
    <sequenceFlow id="B" sourceRef="E" targetRef="F"><sequence Flow>
    <sequenceFlow id="C" sourceRef="F" targetRef="G"><sequence Flow>
    <startEvent id="Start"></startEvent>
    <userTask id="E" assignee="employee">
    </userTask>
    <serviceTask id="F">
      <executionListener name="script">
        <activiti:string><![CDATA[
              Var User-telephone= Get http://127.0.0.1:300/api/user
              If (...) {
              ......
              }]]>
      </activiti:string>
      </executionListener>
    </serviceTask>
    <endEvent id="G"></endEvent>
  </process>
</definitions>
```

```
<?xml version="1.0" encoding="UTF-8"?>                                    P1
<definitions...>
  <process id="process1" StarterUsers="administrator">
    <sequenceFlow id="A" sourceRef="Start" targetRef="E"><sequence Flow>
    <sequenceFlow id="B" sourceRef="E" targetRef="F"><sequence Flow>
    <sequenceFlow id="C" sourceRef="F" targetRef="G"><sequence Flow>
    <startEvent id="Start"></startEvent>
    <userTask id="E" assignee="employee">
    </userTask>
    <serviceTask id="F">
      <executionListener name="script">
        <activiti:string><![CDATA[
              Var User-telephone = Get http://127.0.0.1:100/api/user
              If (...) {
              ......
              }]]>
      </activiti:string>
      </executionListener>
    </serviceTask>
    <endEvent id="G"></endEvent>
  </process>
</definitions>
```

FIG. 5A

```
<?xml version="1.0" encoding="UTF-8"?>                                    P2
<definitions...>
  <process id="process1" StarterUsers="administrator">
    <sequenceFlow id="A" sourceRef="Start" targetRef="E"><sequence Flow>
    <sequenceFlow id="B" sourceRef="E" targetRef="F"><sequence Flow>
    <sequenceFlow id="C" sourceRef="F" targetRef="G"><sequence Flow>
    <startEvent id="Start"></startEvent>
    <userTask id="E" assignee="employee">
    </userTask>
    <serviceTask id="F">
      <executionListener name="script">
        <activiti:string><![CDATA[
               Var User-tel = Get http://127.0.0.1:300/api/user
               If (...) {
               ......
               }]]>
        </activiti:string>
      </executionListener>
    </serviceTask>
    <endEvent id="G"></endEvent>
  </process>
</definitions>
```

```
<?xml version="1.0" encoding="UTF-8"?>                                    P2
<definitions...>
  <process id="process1" StarterUsers="administrator">
    <sequenceFlow id="A" sourceRef="Start" targetRef="E"><sequence Flow>
    <sequenceFlow id="B" sourceRef="E" targetRef="F"><sequence Flow>
    <sequenceFlow id="C" sourceRef="F" targetRef="G"><sequence Flow>
    <startEvent id="Start"></startEvent>
    <userTask id="E" assignee="employee">
    </userTask>
    <serviceTask id="F">
      <executionListener name="script">
        <activiti:string><![CDATA[
               Var User-telephone = Get http://127.0.0.1:200/api/user
               If (...) {
               ......
               }]]>
        </activiti:string>
      </executionListener>
    </serviceTask>
    <endEvent id="G"></endEvent>
  </process>
</definitions>
```

FIG. 5B

INTEGRATION DEVICE AND INTEGRATION METHOD THEREOF

PRIORITY

This application claims priority to Taiwan Patent Application No. 105137456 filed on Nov. 16, 2016, which is hereby incorporated by reference in its entirety.

FIELD

The present invention relates to an integration device and an integration method thereof. Specifically, based on a plurality of artifacts and a plurality of process roles of a local database and artifacts and process roles of other databases, the integration device of the present invention executes an artifact integration procedure, modifies a plurality of processes, and executes a process role integration procedure to update the local database.

BACKGROUND

With the development of the information industry, the amount of information needed in enterprises keeps increasing currently. To manage the large amount of information, the enterprises usually adopt management systems to manage various kinds of information needed in the operation of the enterprises. U.S. Patent Application No. 2007/0162482A1 proposes to decide operations required by the management systems by defining artifacts and constructing business processes for the operation of the enterprises.

Because different management systems are independent from each other, the enterprises often adopt multiple management systems (e.g., a document management system, an income and expenditure management system, a working hour management system, a patent management system or the like) for different operation purposes of the enterprises. In a same enterprises, databases of those management systems usually store highly homogenous and repeated data. To reduce storage resources and management resources required by the multiple management systems, the enterprises usually hope to integrate databases of different management systems so that the different management systems can access the same integrated database. However, different management systems will certainly comprise data and processes of different types because they are used for different purposes. In this case, parameters of artifacts and corresponding application programming interfaces (APIs) for different management systems are certainly different from each other, and variables and attributes of the processes for different management systems are also different. Moreover, process roles of the databases and the setting of access authorities thereof for different management systems are also different.

Accordingly, an urgent need exists in the art to integrate artifacts and process roles of different databases so that processes of the management systems can accurately access the integrated database.

SUMMARY

An objective of certain embodiments of the present invention is to provide an integration mechanism, which compares each artifact of other databases with each artifact of a local database to integrate the artifacts of other databases into the local database, modifies application programming interfaces and processes of the integrated artifacts according to an access authority of each process role in the local database and an access authority of each process role originally in other databases, and finally integrates the process roles added from other databases into the local database with the process roles in the original local database according to access authority relationships of each user account. Accordingly, the integration mechanism of the present invention can integrate artifacts and process roles of databases of different management systems so that processes of the management systems can accurately access the integrated database. In this way, the present invention can remarkably reduce the complexity in introducing new management systems into the enterprises, thereby reducing the storage resources and the management resources required by the management systems.

The disclosure includes an integration device which comprises a storage and a processor. The storage stores a first database. The first database comprises a plurality of first artifacts each of which has a first name. The processor is electrically connected to the storage and is configured to access the first database and a second database. The second database has a plurality of second artifacts therein, and each of the second artifacts has a second name. The processor executes an artifact integration procedure that comprises the following operations: (a) reading the first artifacts from the first database and the second artifacts from the second database; (b) analyzing a similarity between the first name of each of the first artifacts and the second name of each of the second artifacts based on a semantic analysis; and (c) for the first artifact and the second artifact of which the similarity is larger than a threshold, integrating the second artifact into the first artifact, and for any of the second artifacts that cannot be integrated, adding the second artifacts into the first database to update the first database. Moreover, the first database further comprises a plurality of first process roles each of which has a first access authority. The second database further comprises a plurality of second process roles each of which has a second access authority. The processor further adds the second process roles of the second database into the first database. The processor further modifies a plurality of application programming interfaces (APIs) in the updated first database that are associated with the first artifacts and the second artifacts according to the first access authority of each of the first process roles and the second access authority of each of the second process roles and modifies an attribute of each of a plurality of processes according to the modified APIs. Additionally, the processor further executes a process role integration procedure to update the first database, the process role integration procedure comprises the following operations: (d) for each of the first process roles, determining an access authority intersection between the second access authorities of at least one of the second process roles, to which a plurality of first user accounts of the first process role relate, and when another access authority intersection between the first access authorities of at least one of the first process roles, to which a plurality of second user accounts of the second process role corresponding to the access authority intersection relate, corresponds to the first process role, integrating the first process role with the second process role corresponding to the access authority intersection; and (e) retaining in the first database any of the first process roles and any of the second process roles that cannot be integrated.

The disclosure also includes an integration method for an integration device. The integration device comprises a storage and a processor. The storage stores a first database. The first database comprises a plurality of first artifacts each of which has a first name. The processor is electrically connected to the storage and configured to access the first database and a second database. The second database has a plurality of second artifacts therein, and each of the second artifacts has a second name. The integration method is executed by the processor and comprises the following steps: executing an artifact integration procedure which comprises the following steps: (a) reading the first artifacts from the first database and the second artifacts from the second database; (b) analyzing a similarity between the first name of each of the first artifacts and the second name of each of the second artifacts based on a semantic analysis; and (c) for the first artifact and the second artifact of which the similarity is larger than a threshold, integrating the second artifact into the first artifact, and for any of the second artifacts that cannot be integrated, adding the second artifacts into the first database to update the first database. Furthermore, the first database further comprises a plurality of first process roles each of which has a first access authority, and the second database further comprises a plurality of second process roles each of which has a second access authority. The integration method further comprises the following steps of: adding the second process roles of the second database into the first database; modifying a plurality of application programming interfaces (APIs) in the updated first database that are associated with the first artifacts and the second artifacts according to the first access authority of each of the first process roles and the second access authority of each of the second process roles; and modifying an attribute of each of a plurality of processes according to the modified APIs. Additionally, the integration method further comprises the following steps of: executing a process role integration procedure to update the first database, the process role integration procedure comprising the following steps: (d) for each of the first process roles, determining an access authority intersection between the second access authorities of at least one of the second process roles, to which a plurality of first user accounts of the first process role relate, and when another access authority intersection between the first access authorities of at least one of the first process roles, to which a plurality of second user accounts of the second process role corresponding to the access authority intersection relate, corresponds to the first process role, integrating the first process role with the second process role corresponding to the access authority intersection; and (e) retaining in the first database any of the first process roles and any of the second process roles that cannot be integrated.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5A depicts an exemplary example of modifying an attribute of an associated process according to the modified APIs;

FIG. 5B depicts an exemplary example of modifying an attribute of an associated process according to the modified APIs;

DETAILED DESCRIPTION

In the following description, the present invention will be explained with reference to certain example embodiments thereof. These example embodiments are not intended to limit the present invention to any particular examples, embodiments, environment, applications or implementations described in these example embodiments. Therefore, description of these embodiments is only for purpose of illustration rather than to limit the present invention. It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
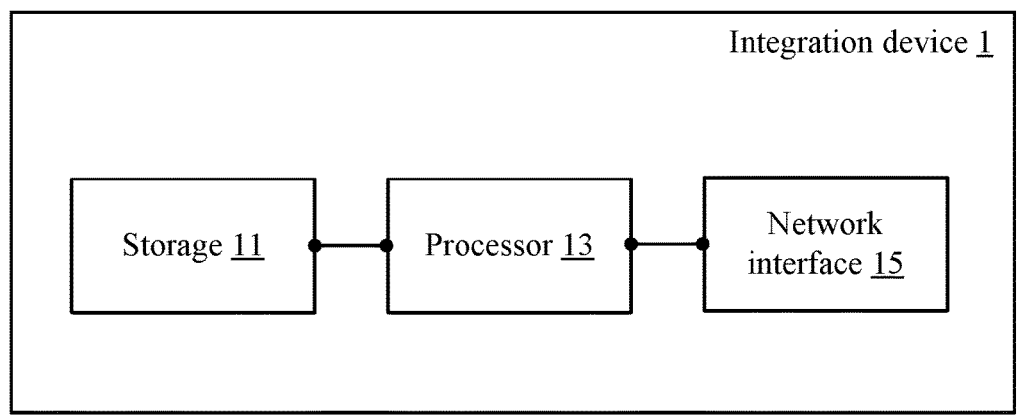
FIG. 1 is a schematic view of an integration device 1 of the present invention.

A first embodiment of the present invention is shown in FIG. 1 to FIG. 6B. FIG. 1 is a schematic view of an integration device 1 of the present invention. The integration device 1 comprises a storage 11, a processor 13 and a network interface 15. The integration device 1 may be a network server or any device capable of data accessing and processing. The processor 13 is electrically connected to the storage 11 and the network interface 15. The network interface 15 may be a wired network interface, a wireless network interface or a combination thereof, and is connected to a network (e.g., the Internet, a local area network, a telecommunication network or any combination thereof).

Figure 2A:
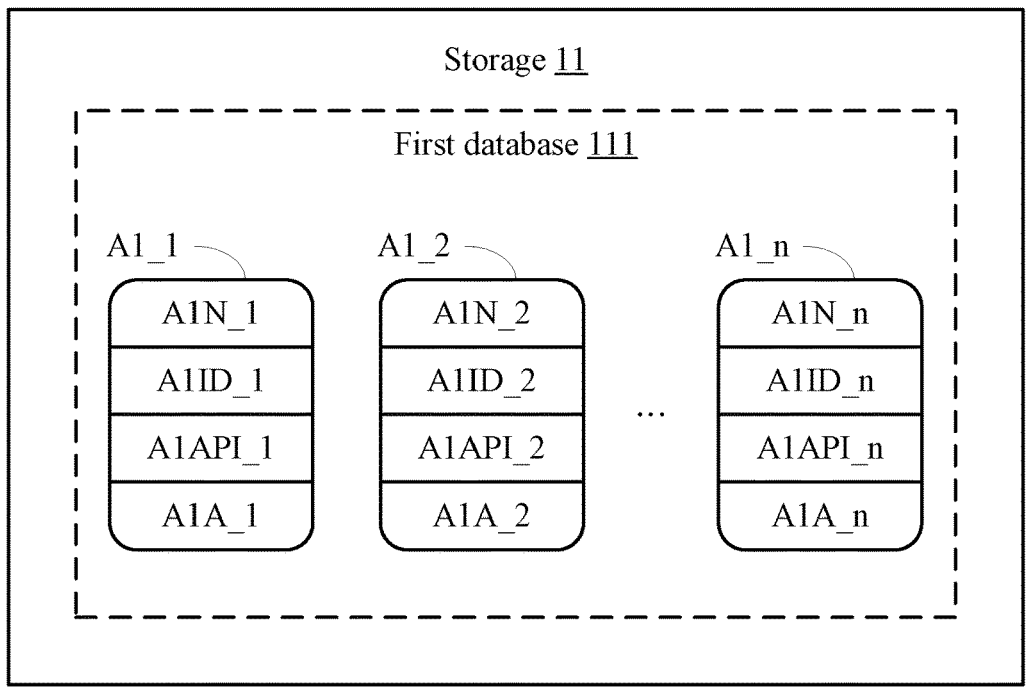
FIG. 2A depicts a storage 11 storing a first database 111.

As shown in FIG. 2A, the storage 11 stores a first database 111, and the first database 111 comprises a plurality of first artifacts $A1\_1, A1\_2, \ldots, A1\_n$. The first artifacts $A1\_1$ to $A1\_n$ respectively have first names $A1N\_1, A1N\_2, \ldots, A1N\_n$, first instance identifiers $A1ID\_1, A1ID\_2, \ldots, A1ID\_n$, first application programming interfaces (APIs) $A1API\_1, A1API\_2, \ldots, A1API\_n$, and first parameter sets $A1A\_1, A1A\_2, \ldots, A1A\_n$. The processor 13 accesses the first database 111 and a second database 21, and executes an artifact integration procedure.

Figure 2B:
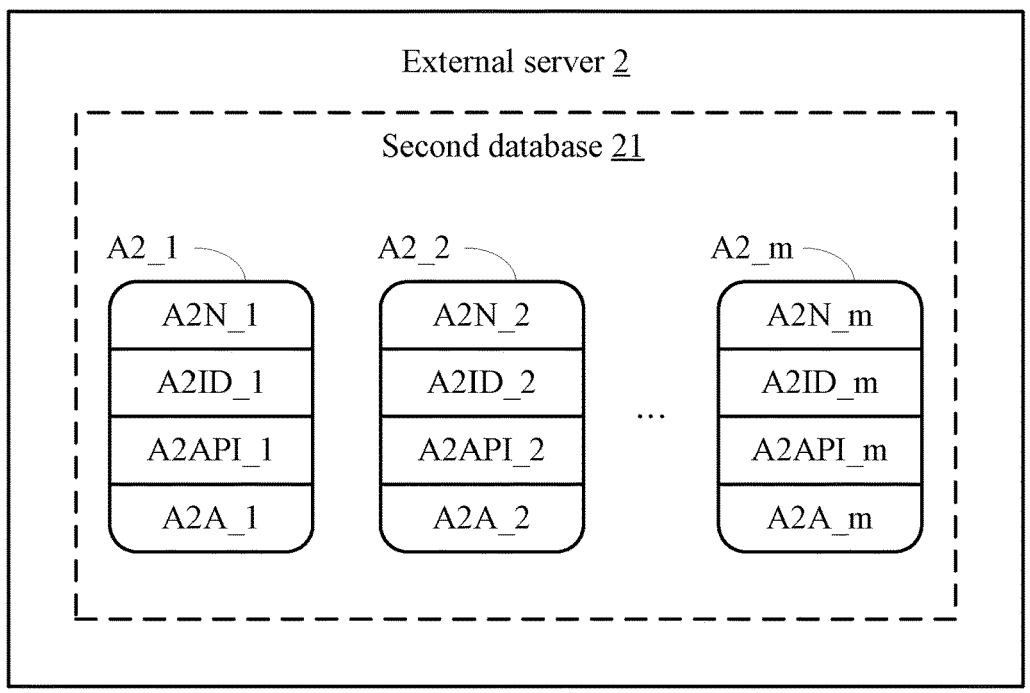
FIG. 2B depicts an external server 2 storing a second database 21.

The second database 21 may be stored in the storage 11 or stored in other servers (e.g., an external server 2). When the second database 21 is stored in the external server 2, the processor 13 accesses the external server 2 via the network interface 15 through the network. Similarly, as shown in FIG. 2B, the second database 21 comprises a plurality of second artifacts $A2\_1, A2\_2, \ldots, A2\_m$. The second artifacts A2_1 to A2_m respectively have second names A2N_1, A2N_2, . . . , A2N_m, second instance identifiers A2ID_1, A2ID_2, . . . , A21ID_m, second application programming interfaces (APIs) A2API_1, A2API_2, . . . , A2API_m, and second parameter sets A2A_1, A2A_2, . . . , A2A_m. The first database 111 and the second database belong to different management systems (e.g., a document management system, an income and expenditure management system, a working hour management system, a patent management system or the like).

Figure 2C:
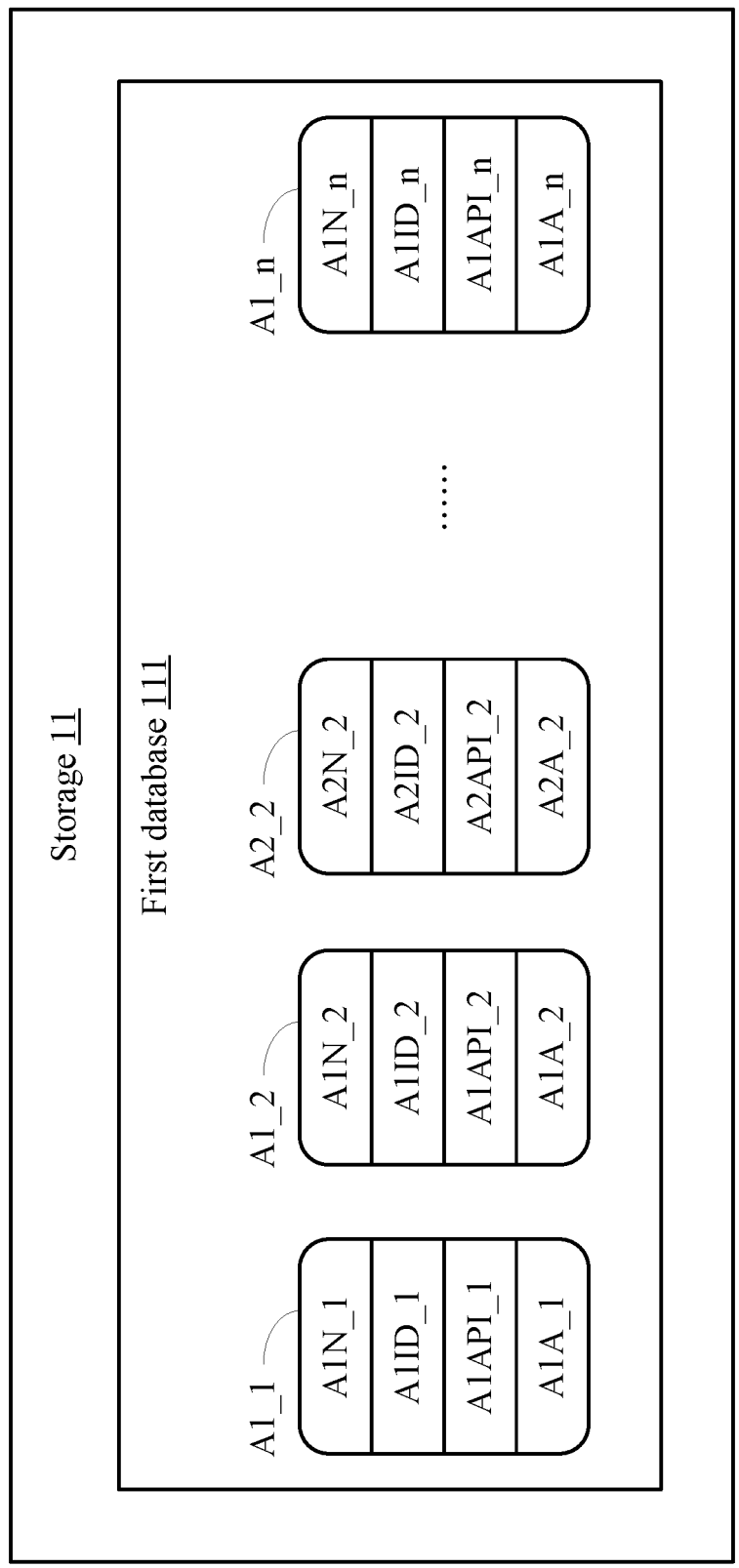
FIG. 2C depicts the integrated first database 111 of the present invention.

Please refer to FIG. 2A to FIG. 2C for an artifact integration procedure. First, the processor 13 reads the first artifacts A1_1, A1_2, . . . , A1_n from the first database 111 and the second artifacts A2_1, A2_2, . . . , A2_m from the second database 21. Next, the processor 13 analyzes a similarity between the first names A1N_1, A1N_2, . . . , A1N_n of the first artifacts A1_1, A1_2, . . . , A1_n and the second names A2N_1, A2N_2, . . . , A2N_m of the second artifacts A2_1 to A2_m based on a semantic analysis. As shown in FIG. 2C, for a first artifact A1_x and a second artifact A2_y of which the similarity is larger than a threshold (where x is 1~n and y is 1~m), the processor 13 integrates a second artifact A2_x into a first artifact A1_y, and adds the second artifacts A2_y that cannot be integrated into the first database 111 to update the first database 111.

Figure 3:
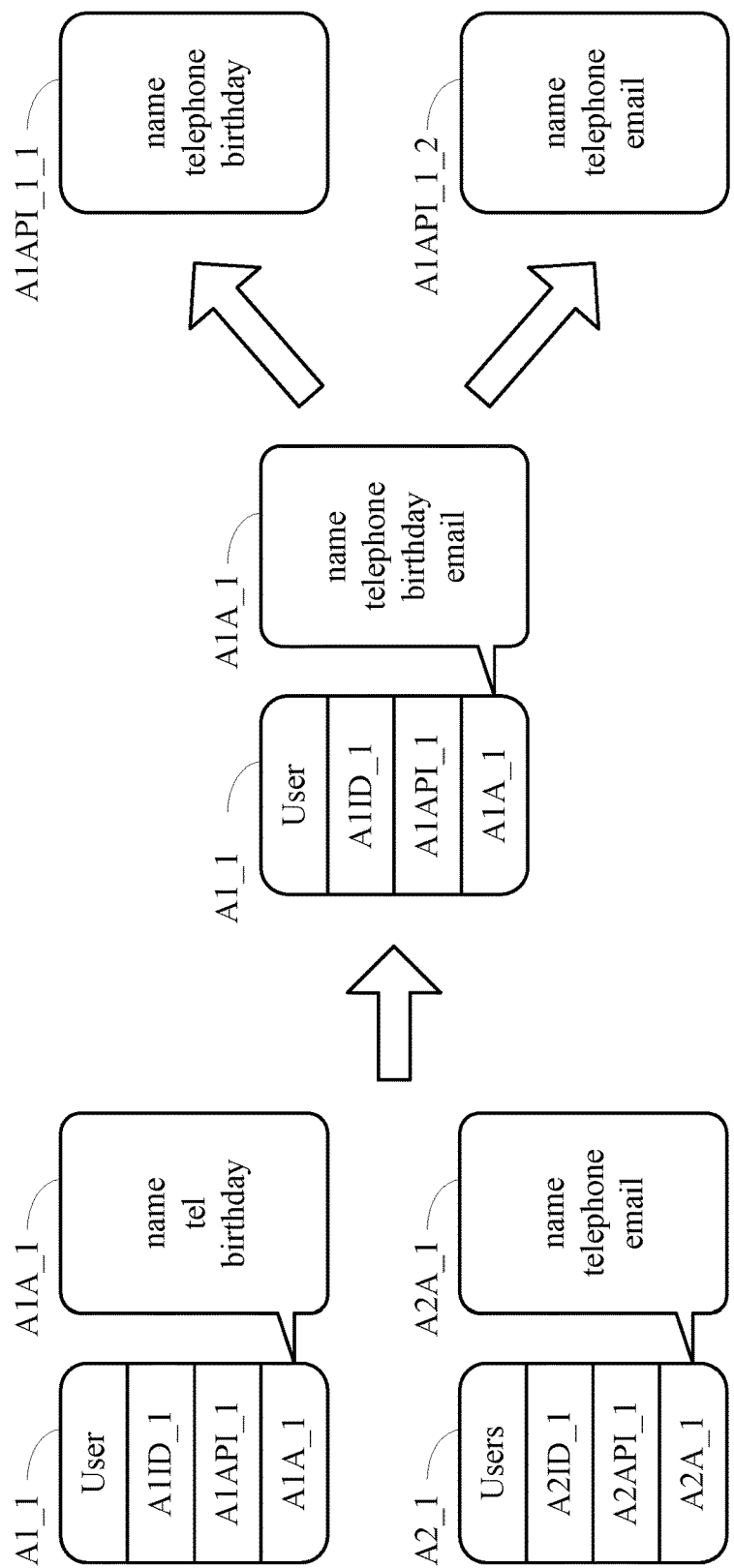
FIG. 3 is a schematic view depicting the modification of application programming interfaces (APIs) based on access authorities of process roles after the integration of artifacts.

For example, referring to FIG. 3, it is assumed that the first name A1N_1 of the first artifact A1_1 is "User", the second name A2N_1 of the second artifact A2_1 is "Users", and the threshold is 80%. When the processor 13 analyzes that the similarity between the first names "User" of the first artifact A1_1 and the second name "Users" of the second artifact A2_1 is 98% based on the semantic analysis, it determines that the similarity is greater than the threshold and thus the first artifact A1_1 and the second artifact A2_1 can be integrated. Thereafter, when the second artifact A2_1 is integrated into the first artifact A1_1, the processor 13 further determines whether any parameter of the second parameter set A2A_1 is not included in the first parameter set A1A_1, and determines whether any parameter of the second parameter set A2A_1 is similar to the parameters in the first parameter set A1A_1.

It is assumed that the first parameter set A1A_1 of the first artifact A1_1 includes parameters "name", "tel" and "birthday", and the second parameter set A2A_1 of the second artifact A2_1 includes parameters "name", "telephone" and "email". Thus, the processor 13 determines that the parameter "email" in the second parameter set A2A_1 is not included in the first parameter set A1A_1, and adds the parameter "email" to the first parameter set A1A_1. Moreover, the processor 13 further determines that the parameter "tel" in the first parameter set A1A_1 is similar to the parameter "telephone" in the second parameter set A2A_1 based on the semantic analysis, and thus integrates the parameter "telephone" with the parameter "tel" instead of directly adding the parameter "telephone" into the first parameter set A1A_1. As shown in FIG. 3, the integrated first parameter set A1A_1 includes parameters "name", "telephone", "birthday" and "email".

In other embodiments, for any of the second artifacts that cannot be integrated and that are added into the first database 111, the processor 13 adds a first instance identifier (ID) and fills the first instance ID into the second artifact. Moreover, in other embodiments, before the first artifact A1_x and the second artifact A2_y of which the similarity is larger than the threshold are integrated, the processor 13 may first generate an artifact integration confirmation list which includes artifacts that can be integrated, names of the integrated artifacts and names of the integrated parameters or the like. The artifact integration confirmation list is provided to a system administrator for confirmation (e.g., the artifact integration confirmation list is displayed in a display connected to the integration device 1, or a message carrying the artifact integration confirmation list is transmitted to a user device used by the system administrator for confirmation by the system administrator). After the artifact integration confirmation list is confirmed by the system administrator, the processor 13 integrates the artifacts according to the confirmation instruction.

It shall be appreciated that, in the artifact integration procedure, the setting of the threshold of the semantic analysis may be adjusted depending on practical integration conditions (e.g., depending on properties, application fields and software companies of two database systems, but not limited thereto), and the setting of the threshold of the names and the setting of the threshold of the parameters may be different.

Figure 6A:
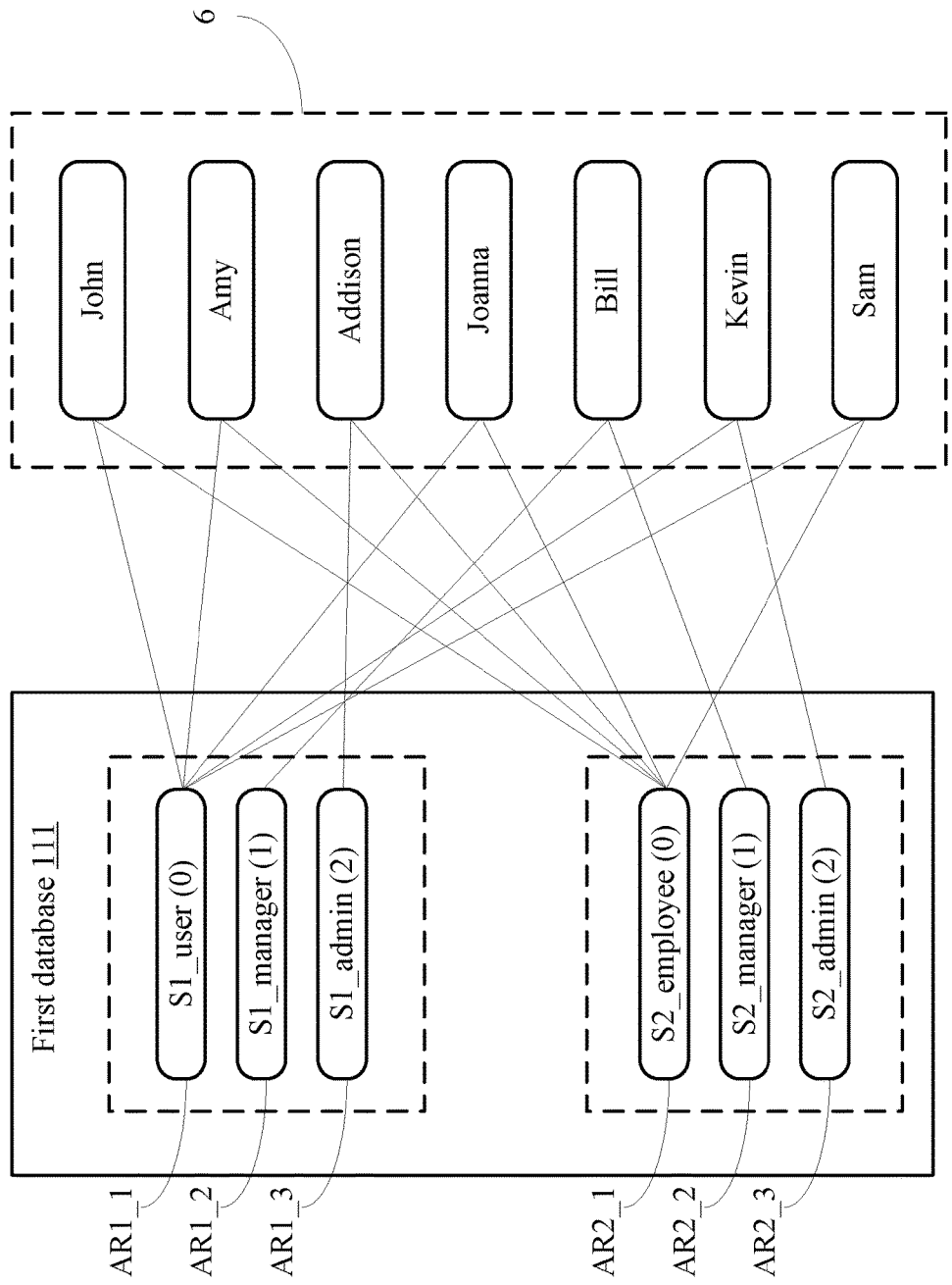
FIG. 6A depicts correspondence relationships between user accounts and a first application role as well as a second application role.

In addition to the aforesaid first artifacts A1_1 to A1_n, the first database 111 further comprises a plurality of first process roles AR1_1, AR1_2 and AR1_3 each of which has a first access authority, and the second database 21 further comprises a plurality of second process roles AR2_1, AR2_2 and AR2_3 each of which has a second access authority as shown in FIG. 6A. Each of the process roles and the access authority thereof are stored in a database in the form of a mapping table (e.g., a description file recording mapping relationships between each of the process roles and the access authority thereof). After the artifact integration procedure, the processor 13 adds the mapping table in the second database 21 for recording each of the process roles and the access authority thereof into the first database 111. In other words, the integrated first database 111 includes both the first process roles AR1_1 to AR1_3 and the second process roles AR2_1, AR2_2 and AR2_3.

Thereafter, the processor 13 further modifies a plurality of application programming interfaces (APIs) A1API_z (z is 1 to P, and P is a positive integer and represents the total number of APIs of the integrated first database 111) in the updated first database 111 that are associated with the first artifact A1_x and the second artifact A2_y according to the first access authority of each of the first process roles AR1_1 to AR1_3 and the second access authority of each of the second process roles AR2_1 to AR2_3, and modifies an attribute of each of a plurality of processes according to the modified application programming interfaces A1API_z.

For example, as shown in FIG. 3, the integrated first parameter set A1A_1 includes the parameters "name", "telephone", "birthday" and "email". However, after the first database 111 is integrated with the second database 21, each of the first process roles AR1_1 to AR1_3 and each of the second process roles AR2_1 to AR2_3 all call the integrated A1API_1, so each of the first process roles AR1_1 to AR1_3 and each of the second process roles AR2_1 to AR2_3 can access all the data in the integrated first database 111, i.e., the first process roles AR1_1 to AR1_3 and the second process roles AR2_1 to AR2_3 all can access the parameters "name", "telephone", "birthday" and "email", as shown in an exemplary example 4 of FIG. 4. Thus, each of the first process roles AR1_1 to AR1_3 and each of the second process roles AR2_1 to AR2_3 have the same access authority to the updated first database 111.

To solve the problem about the access authority, the present invention further modifies the APIs corresponding to the artifacts. Please refer to FIG. 4 and FIG. 6A, it is assumed that the access authority of the first process role AR1_3 is 2, and the parameters that can be accessed by the first process role AR1_3 in the first artifact A1_1 of the original first database 111 include "name", "tel" and "birthday"; and it is assumed that the access authority of the second process role AR2_3 is 2, and the parameters that can be accessed by the second process role AR2_3 in the second artifact A2_1 of the original second database 21 include "name", "telephone" and "email". To enable the first process role AR1_3 and the second process role AR2_3 to access the parameters in the updated first database 111, that are the same as the parameters respectively in the original first database 111 and the second database 21, according to the respective access authority thereof, the processor 13 modifies the first application programming interface A1API_1 associated with the first artifact A1_1 in the updated first database 111 according to the first application programming interface A1API_1 corresponding to the access authority of the first process role AR1_3 in the first artifact A1_1 before the updating and the second application programming interface A2API_1 corresponding to the access authority of the second process role AR2_3 in the second artifact A2_1 so as to respectively add a first application programming interface A1API_1_1 and a first application programming interface A1API_1_2.

The first application programming interface A1API_1_1 corresponds to the corresponding first application programming interface A1API_1 in the first artifact A1_1 before the updating, and the first application programming interface A1API_1_2 corresponds to the corresponding second application programming interface A2API_1 in the second artifact A2_1 before the updating. In this way, as shown in an exemplary example 41 of FIG. 4, the first process role AR1_3 calls the first application programming interface A1API_1_1 of which the attribute in the corresponding procedure (i.e., the website corresponding to the first application programming interface A1API_1_1) is "http://127.0.0.1:100/api/user", and the response contents include corresponding data of the parameters "name", "telephone" and "birthday".

Figure 4:
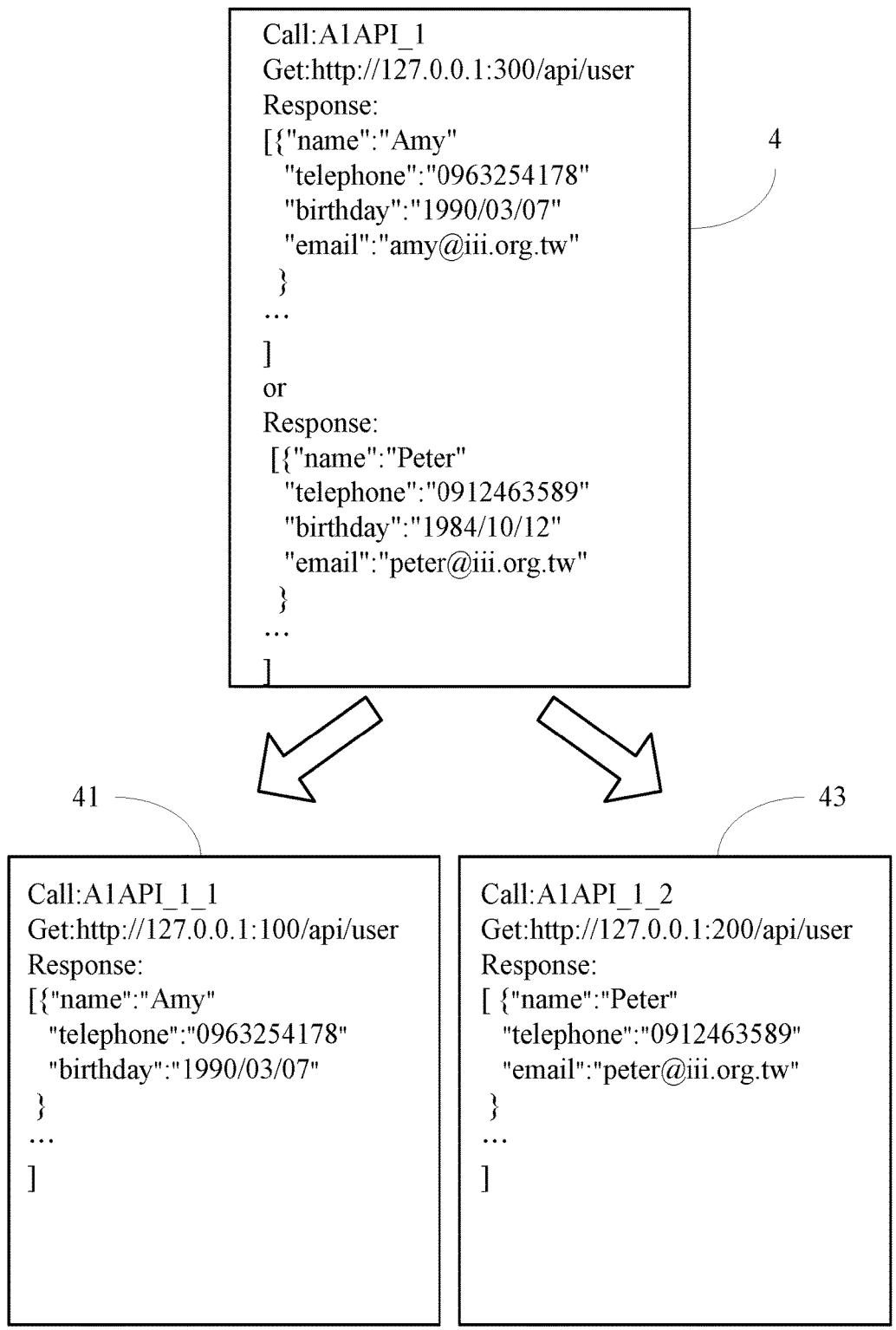
FIG. 4 depicts an exemplary example of calling different APIs and obtaining corresponding response data.

Similarly, as shown in an exemplary example 43 of FIG. 4, the second process role AR2_3 calls the first application programming interface A1API_1_2 of which the attribute in the corresponding procedure (i.e., the website corresponding to the first application programming interface A1API_1_2) is "http://127.0.0.1:200/api/user", and the response contents include corresponding data of the parameters "name", "telephone" and "email". Accordingly, by calling the different APIs, the first process role AR1_3 can access the parameters "name", "telephone" and "birthday", and the second process role AR2_3 can access the parameters "name", "telephone" and "email".

Moreover, in other embodiments, a same first programming interface A1API_z may also correspond to several process roles of different access authorities through modification and transmit back parameters that can be accessed corresponding to the access authority according to the access authority of each of the process roles. Based on above descriptions, those of ordinary skill in the art may easily appreciate various embodiments in which how the present invention modifies the APIs with respect to the access authorities of different process roles according to the integration of the artifacts, and thus will not be further described herein.

After modifying the APIs in the updated first database 111 that are associated with the first artifacts A1_x and the second artifacts A2_y, the processor 13 modifies an attribute of each of a plurality of processes according to the modified APIs. These processes respectively belong to different management systems (e.g., a document management system, an income and expenditure management system, a working hour management system, a patent management system or the like). Each of the processes may be constituted by Extensible Markup Language (XML) documents conforming to the Business Process Modeling Notation (BPMN), these processes may be respectively stored and executed in different servers, and the integration device 1 accesses these servers via the network to modify the processes. Moreover, in other embodiments, the processes may be constituted by XML documents conforming to the Business Process Execution Language (BPEL).

As shown in FIG. 5A, the attribute in a process P1 is "http://127.0.0.1:300/api/user" and it corresponds to the integrated first application programming interface A1API_1. The processor 13 modifies the attribute "http://127.0.0.1:300/api/user in the process P1 into "http://127.0.0.1:100/api/user" to correspond to the first application programming interface A1API_1_1 according to the modified first application programming interfaces. Furthermore, as shown in FIG. 5B, the attribute in a process P2 is "http://127.0.0.1:300/api/user" and it represents the integrated first application programming interface A1API_1. The processor 13 modifies the attribute "http://127.0.0.1:300/api/user in the process P2 into "http://127.0.0.1:200/api/user" to correspond to the first application programming interface A1API_1_2 according to the modified first application programming interfaces. It shall be appreciated that, in addition to modifying the attributes of the processes, the processor 13 further modifies variables of the process P1 and the process P2 so that names of the variables of the process P1 and the process P2 are the same if the process P1 and the process P2 need to be further integrated. For example, in FIG. 5B, the processor 13 modifies the variable "User-tel" in the process P2 into "User-telephone" according to the modified first APIs.

After the integration device 1 accordingly modifies the attributes of the processes in response to the modification to the APIs, the management systems using the integrated first database 111 can be put into operation and the system administrator may add user accounts 6. Thereafter, the processor 13 of the integration device 1 may further execute a process role integration procedure in response to the process roles and the access authorities thereof corresponding to the user accounts 6 in different management systems.

In this embodiment, the process role includes an application role. Please refer to FIG. 6A and FIG. 6B for a process role integration procedure. The user accounts 6 include a plurality of first user accounts and a plurality of second user accounts. For each of the first process roles AR1_1 to AR1_3, the processor 13 determines an access authority intersection between the second access authorities of at least one of the second process roles, to which the plurality of first user accounts of the first process role currently in comparison relate, and when another access authority intersection between the first access authorities of at least one of the first process roles, to which the plurality of second user accounts of the second process role corresponding to the access authority intersection relate, also corresponds to the first process role currently in comparison, the processor 13 integrates the first process role currently in comparison with the second process role (i.e., the second process role corresponding to the access authority intersection) and retains in the first database 111 any of the first process roles and any of the second process roles that cannot be integrated.

It shall be appreciated that, the first user accounts may overlap with the second user accounts (i.e., the same user account may exist in different management systems at the same time). Moreover, in the access authorities of the process roles, the contents that can be accessed by the process role of a higher access authority include the contents that can be accessed by the process role of a lower access authority. For example, the contents that can be accessed by the process role of which the access authority is "2" include the contents that can be accessed by the process roles of which the access authorities are respectively "1" and "0". The access authority intersection represents the common access authority which the at least one of the process roles corresponding to the user accounts 6.

Figure 6B:
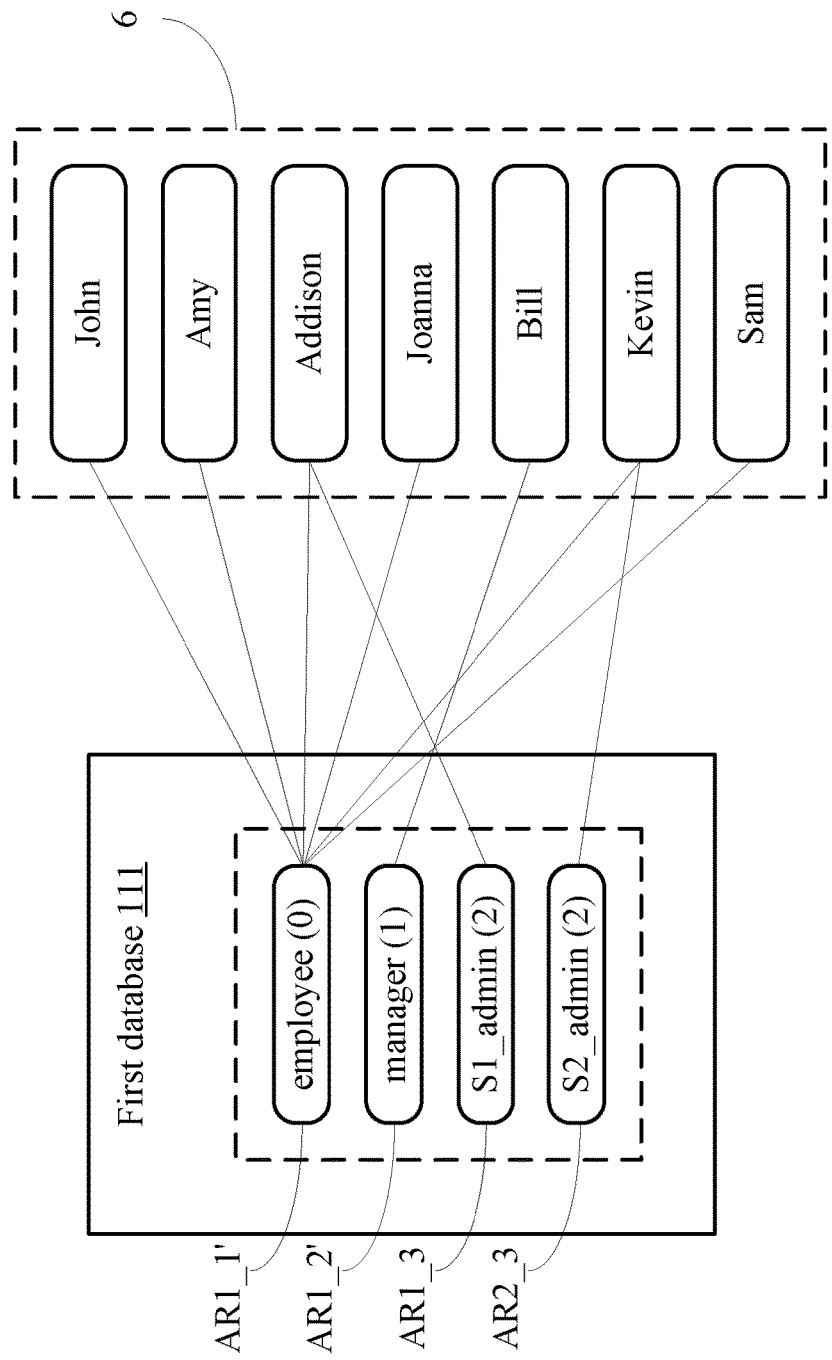
FIG. 6B depicts correspondence relationships between the user accounts and the integrated first application role.

For example, as shown in FIG. 6A and FIG. 6B, it is assumed that the first process role AR1_1 includes first user accounts "John", "Amy", "Joanna", "Kevin" and "Sam", the first user accounts "John", "Amy", "Joanna" and "Sam" further correspond to the second process role AR2_1 of which the access authority is "0", and the first user account "Kevin" further corresponds to the second process role AR2_3 of which the access authority is "2". Because the second process role AR2_3 of which the access authority is "2" includes the contents that can be accessed by the second process role AR2_1 of which the access authority is "0", the access authority intersection between the second process role AR2_1 and the second process role AR2_3 is the access authority "0".

The access authority "0" corresponds to the second process role AR2_1, which includes second user accounts "John", "Amy", "Addison", "Joanna" and "Sam". Next, the processor 13 determines that the second user accounts "John", "Amy", "Joanna" and "Sam" correspond to the first process role AR1_1 of which the access authority is "0", and the second user account "Addison" corresponds to the first process role AR1_3 of which the access authority is "2". Because the first process role AR1_3 of which the access authority is "2" includes the contents that can be accessed by the first process role AR1_1 of which the access authority is "0", the access authority intersection between the first process role AR1_1 and the first process role AR1_3 is the access authority "0" which corresponds to the first process role AR1_1.

Due to the correspondence relationships between the first process role AR1_1 and the second process role AR2_1, the processor 13 can integrate the first process role AR1_1 with the second process role AR2_1 to form a new first process role AR1_1'. Similarly, the processor 13 integrates the first process role AR1_2 with the second process role AR2_2 to form a new first process role AR1_2'.

As another example, it is assumed that the first process role AR1_3 includes first user account "Addison", and the first user account "Addison" further corresponds to the second process role AR2_1 of which the access authority is "0". However, as described above, the second process role AR2_1 of which the access authority is "0" includes the second user accounts "John", "Amy", "Addison", "Joanna" and "Sam", and the access authority intersection between the at least one of the first process roles, to which the second user accounts "John", "Amy", "Addison", "Joanna" and "Sam" relate, is the access authority "0" which corresponds to the first process role AR1_1 rather than the first process role AR1_3 of which the access authority is "2". Therefore, the first process role AR1_3 and the second process role AR2_1 cannot be integrated.

As yet another example, it is assumed that the second process role AR2_3 includes second user account "Kevin", and the second user account "Kevin" further corresponds to the first process role AR1_1 of which the access authority is "0". However, as described above, the first process role AR1_1 of which the access authority is "0" includes the first user accounts "John", "Amy", "Joanna", "Kevin" and "Sam", and the access authority intersection between the at least one of the second process roles, to which the first user accounts "John", "Amy", "Joanna", "Kevin" and "Sam" relate, is the access authority "0" which corresponds to the second process role AR2_1 rather than the second process role AR2_3 of which the access authority is "2". Therefore, the second process role AR2_3 and the first process role AR1_1 cannot be integrated.

After integrating the process roles that can be integrated in the first process roles AR1_1 to AR1_3 and the second process roles AR2_1 to AR2_3, for the first process role AR1_3 and the second process roles AR2_3 that cannot be integrated, the processor 13 retains them in the first database 111, as shown in FIG. 6B.

In other embodiments, after performing comparison between each of the first process roles AR1_1 to AR1_3 and each of the second process roles AR2_1 to AR2_3, the processor 13 generates a process role integration confirmation list which includes process roles that can be integrated, names of the integrated process roles or the like. The process role integration confirmation list is provided to an system administrator for confirmation (e.g., the process role integration confirmation list is displayed in a display connected to the integration device 1, or a message carrying the process role integration confirmation list is transmitted to a user device used by the system administrator for confirmation by the system administrator). After the process role integration confirmation list is confirmed by the system administrator, the processor 13 integrates the process roles according to the confirmation instruction.

Please refer to FIG. 6A to FIG. 7B for a second embodiment of the present invention. The second embodiment is an extension of the first embodiment. In this embodiment, the process role comprises both of an application role and a business process management (BPM) role. There are one-to-one correspondence relationships between the application roles and the BPM roles, i.e., first application roles AR1_1 to AR1_3 respectively correspond to first BPM roles BR1_1 to BR1_3, and second application roles AR2_1 to AR2_3 respectively correspond to second BPM roles BR2_1 to BR2_3.

As shown in FIG. 6A and FIG. 6B, after the first application roles AR1_1 to AR1_3 and the second application roles AR2_1 to AR2_3 are integrated or added through the process role integration procedure of the aforesaid embodiment, the first BPM roles BR1_1 to BR1_3 corresponding to the first application roles AR1_1 to AR1_3 and the second BPM roles BR2_1 to BR2_3 corresponding to the second application roles AR2_1 to AR2_3 are also integrated or added into the first database 111.

Figure 7A:
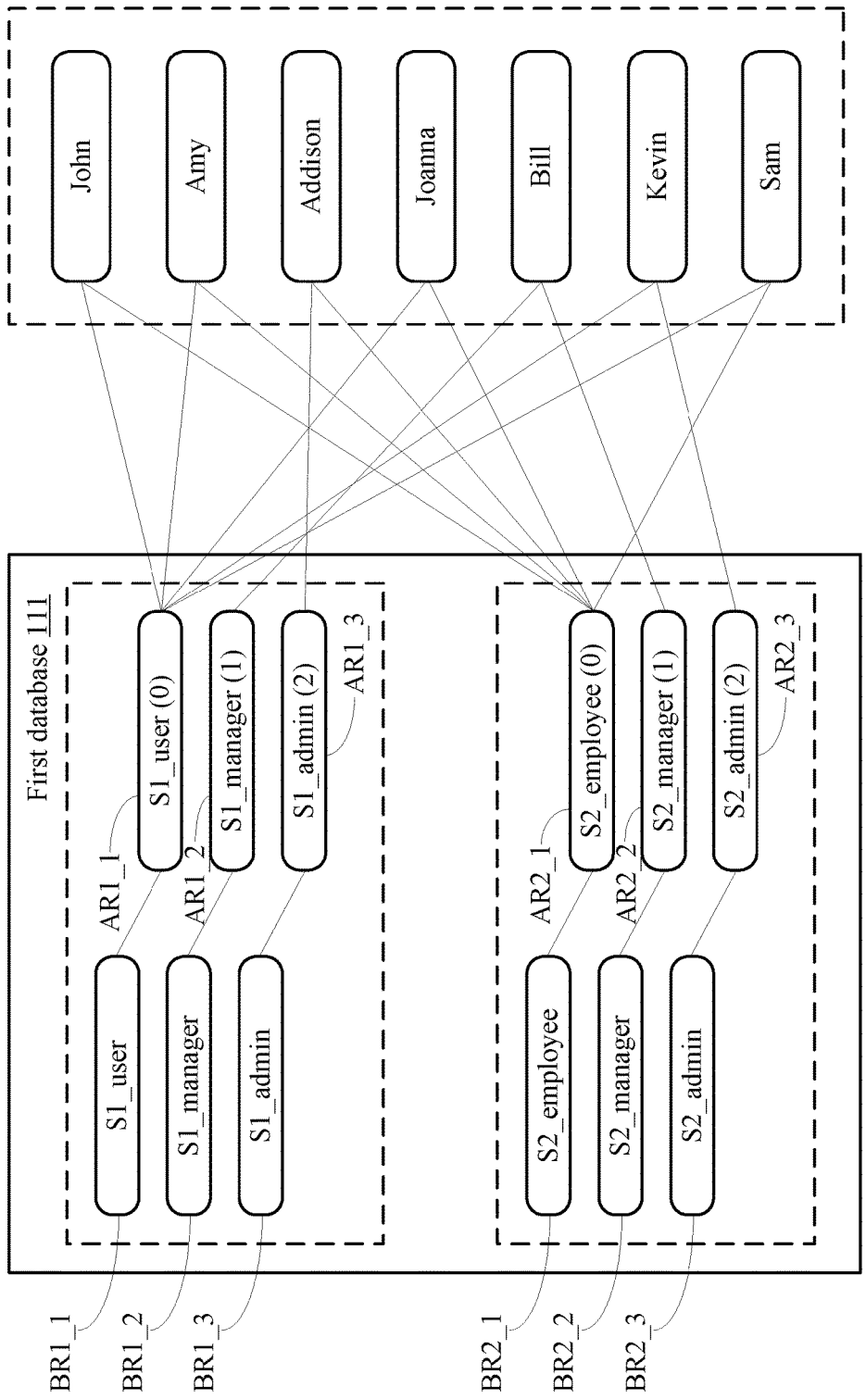
FIG. 7A depicts correspondence relationships between user accounts and a business process management (BPM) role as well as an application role.
Figure 7B:
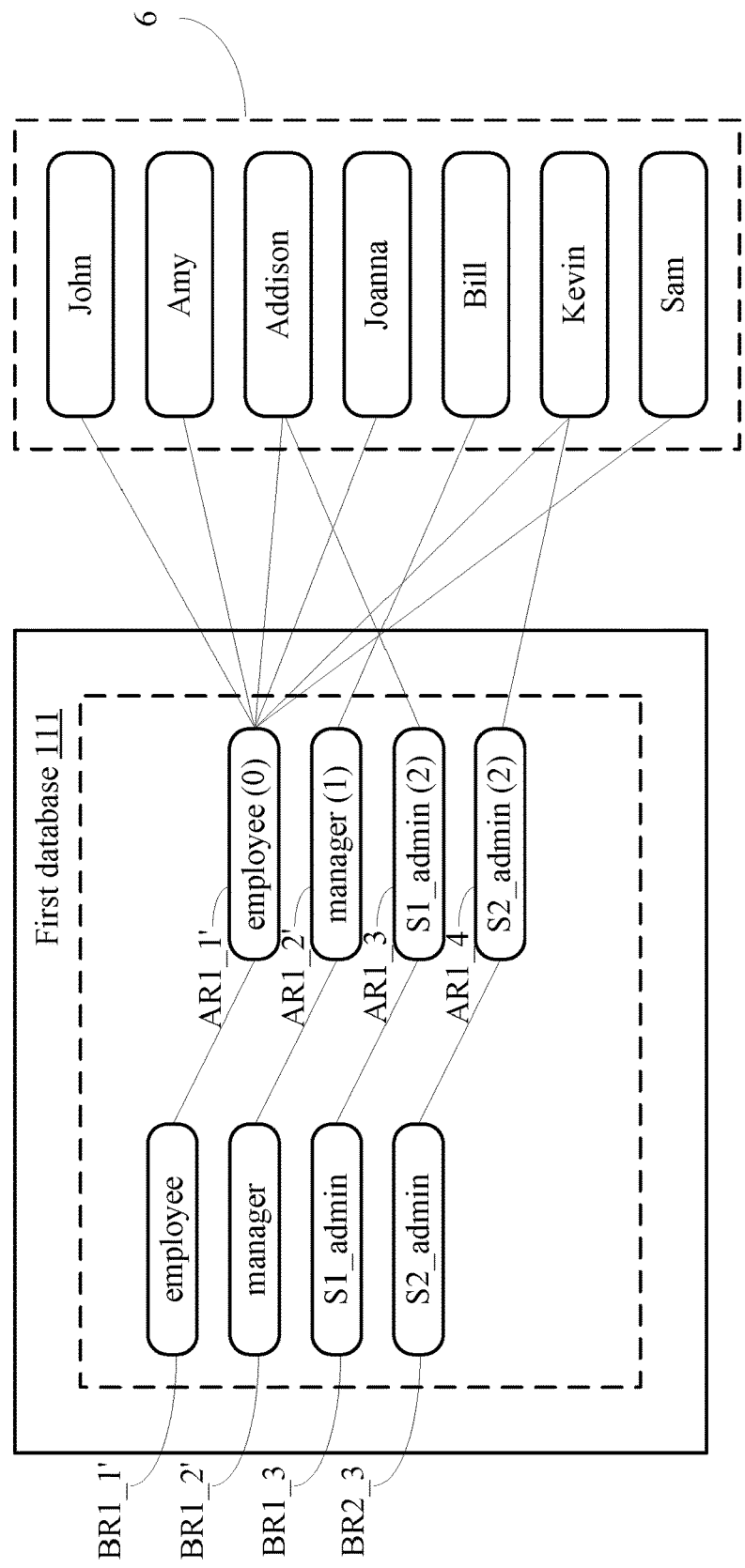
FIG. 7B depicts correspondence relationships between the user accounts and the integrated BPM role as well as the application role.

For example, referring to FIG. 7A and FIG. 7B, because the first application role AR1_1 of which the name is "S1_user(0)" and the second application role AR2_1 of which the name is "S2_employee(0)" have been integrated into a first application role AR1_1' of which the name is "employee(0)", the first BPM roles BR1_1 which has the name of "S1_user" and corresponds to the first application role AR1_1 and the second BPM roles BR2_1 which has the name of "S2_employee" and corresponds to the second application role AR2_1 will be integrated into a first BPM roles BR1_1' of which the name is "employee". Similarly, in response to that the first process role AR1_2 and the second process role AR2_2 are integrated into a first application role AR1_2', the first BPM role BR1_2 and the second BPM role BR2_2 are also integrated into a first BPM role BR1_2'.

As another example, because the first application role AR1_3 of which the name is "S1_admin(2)" and the second application role AR2_3 of which the name is "S2_admin(2)" are not integrated but are retained in the first database 111, the first BPM roles BR1_3 which has the name of "S1_admin" and corresponds to the first application role AR1_3 and the second BPM roles BR2_3 which has the name of "S2_admin" and corresponds to the second application role AR2_3 will also be retained in the first database 111.

It shall be appreciated that, in response to the integration of the process roles (the application roles and the BPM roles), the processor 13 further updates the APIs and User Interfaces (UIs) corresponding to the process roles before the integration so that the APIs and the UIs can be related to the integrated process roles. The integration of the process roles and the corresponding updating of the APIs and the UIs associated with the process roles shall be appreciated by those of ordinary skill in the art based on the aforesaid descriptions, and thus will not be further described herein.

Figure 8:
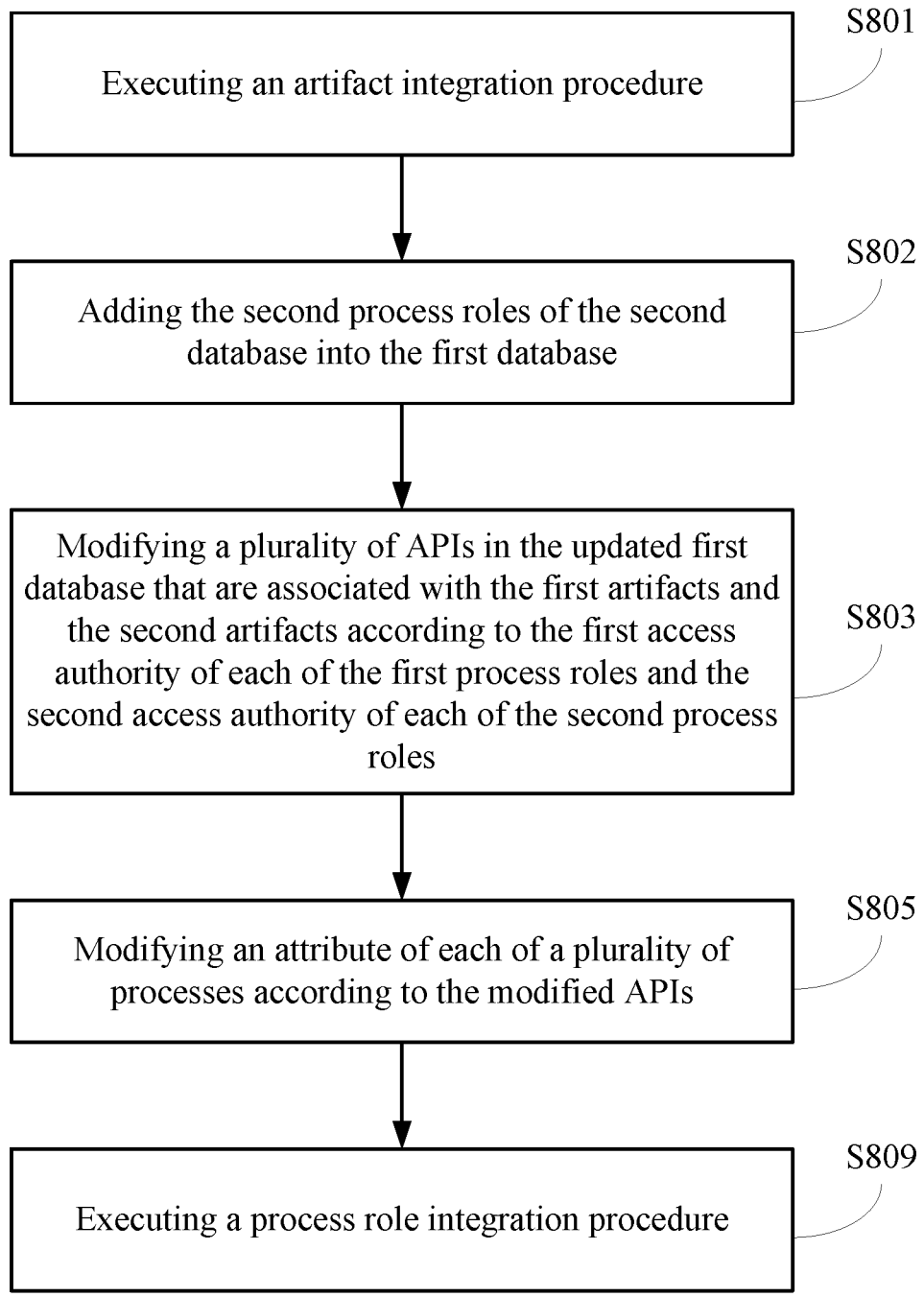
FIG. 8, FIG. 9 and FIG. 10 are flowchart diagrams of an integration method according to the present invention.

A third embodiment of the present invention is an integration method, and a flowchart diagram thereof is shown in FIG. 8. The integration method is adapted to an integration device (e.g., the integration device 1 of the aforesaid embodiment). An integration device comprises a storage, a processor and a network interface. The storage stores a first database. The first database comprises a plurality of first artifacts each of which has a first name. The first database further comprises a plurality of first process roles each of which has a first access authority. The processor is electrically connected to the storage and configured to access the first database and a second database. Similarly, the second database comprises a plurality of second artifacts each of which has a second name. The second database further comprises a plurality of second process roles each of which has a second access authority. The integration method is executed by the processor.

Figure 9:
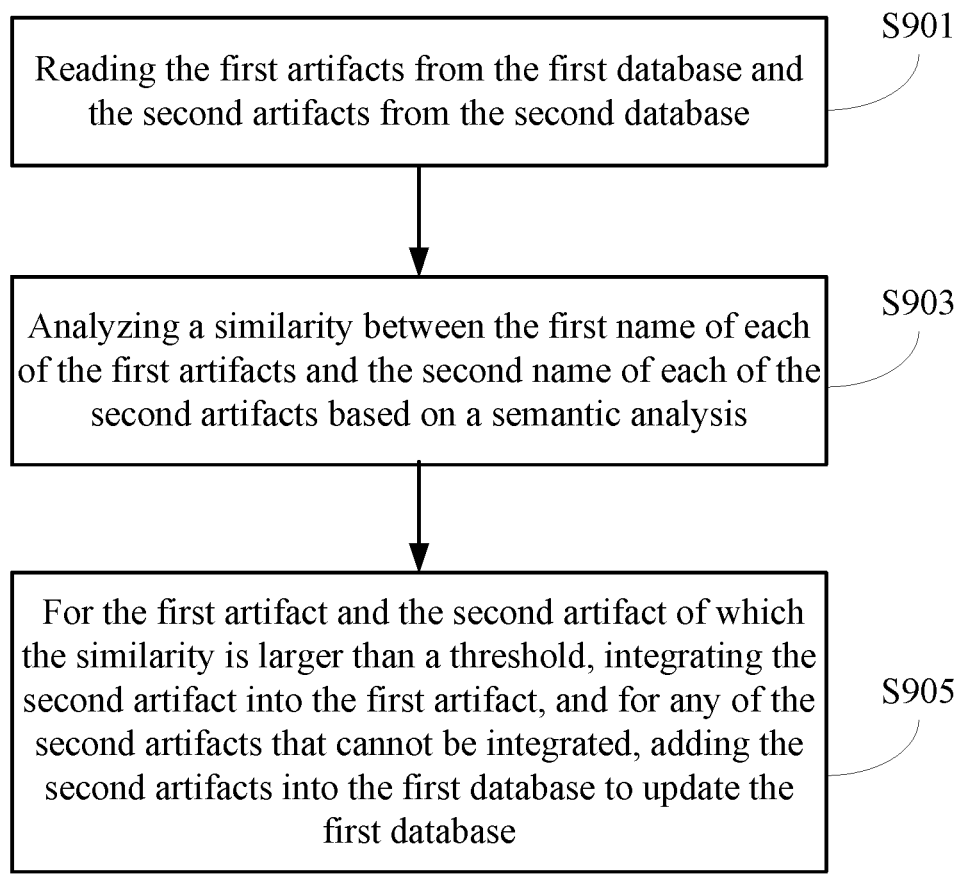

First, in step S801, an artifact integration procedure is executed. The artifact integration procedure comprises steps as shown in FIG. 9. In step S901, the first artifacts are read from the first database, and the second artifacts are read from the second database. Thereafter, in step S903, a similarity between the first name of each of the first artifacts and the second name of each of the second artifacts is analyzed based on a semantic analysis. In step S905, for the first artifact and the second artifact of which the similarity is larger than a threshold, the second artifact is integrated into the first artifact, and for any of the second artifacts that cannot be integrated, the second artifacts are added into the first database to update the first database.

Next, the processor executes step S802 to add the second process roles of the second database into the first database. Then, the processor executes the step S803 to modify a plurality of application programming interfaces (APIs) in the updated first database that are associated with the first artifacts and the second artifacts according to the first access authority of each of the first process roles and the second access authority of each of the second process roles. Thereafter, in step S805, an attribute of each of a plurality of processes is modified according to the modified APIs. The processes are stored and run in one of the integration device, at least a server, and a combination thereof. Finally, in step S809, a process role integration procedure is executed.

Figure 10:
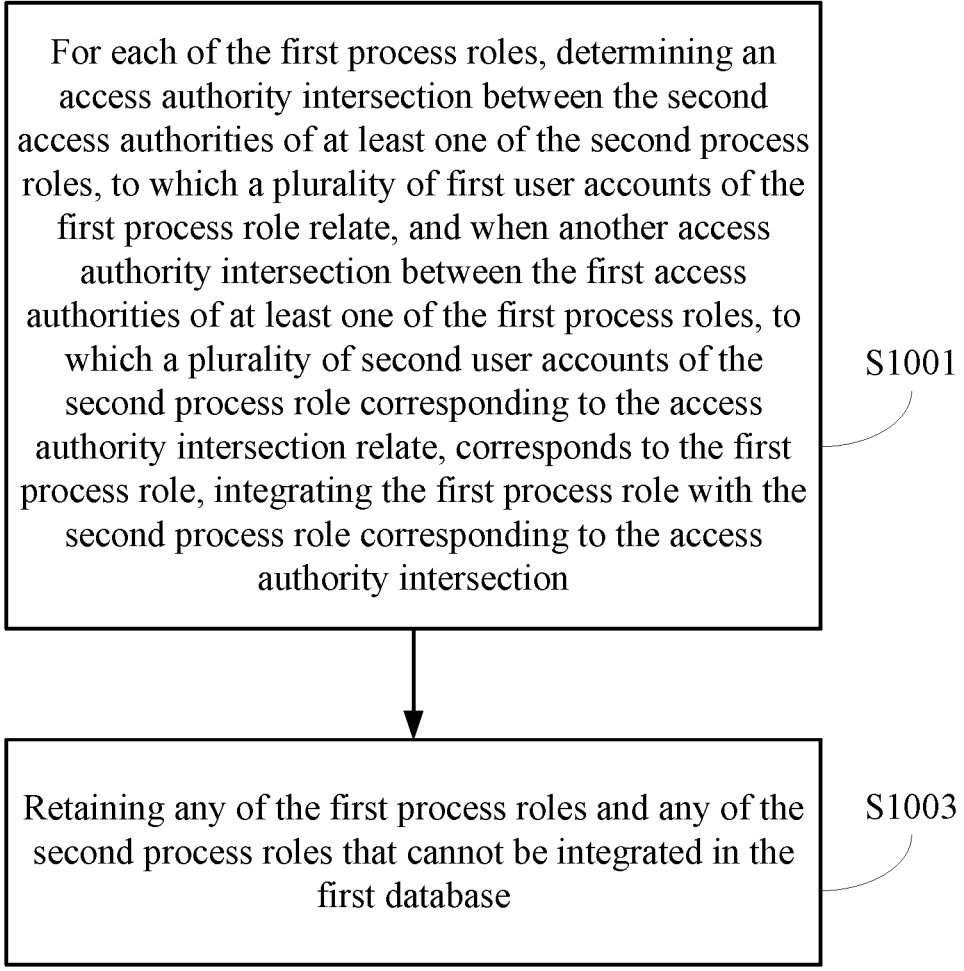

The process role integration procedure comprises steps as shown in FIG. 10. In step S1001, for each of the first process roles, an access authority intersection between the second access authorities of at least one of the second process roles, to which a plurality of first user accounts of the first process role relate, is determined, and when another access authority intersection between the first access authorities of at least one of the first process roles, to which a plurality of second user accounts of the second process role corresponding to the access authority intersection relate, corresponds to the first process role, the first process role is integrated with the second process role corresponding to the access authority intersection. Next, in step S1003, any of the first process roles and any of the second process roles that cannot be integrated are retained in the first database.

Moreover, in other embodiments, each of the first artifacts has a first API set and a first parameter set, and each of the second artifacts has a second API set and a second parameter set. The artifact integration procedure further comprises the following steps after the step S905: for the first artifact and the second artifact of which the similarity is larger than the threshold, determining whether at least one parameter of the second parameter set is not included in the first parameter set of the first artifact, and when the at least one parameter of the second parameter set is not included in the first parameter set of the first artifact, adding the at least one parameter into the first parameter set of the first artifact and revising the first API set of the first artifact according to the at least one parameter; generating an artifact integration confirmation list; for any of the second artifacts that cannot be integrated and that are added into the first database, adding a first instance ID and filling the first instance ID into the second artifact; and for the first artifact and the second artifact of which the similarity is larger than the threshold, sealing up the second artifact.

Additionally, in an embodiment, each of the first process roles comprises a first application role and a first business process management (BPM) role, and each of the second process roles comprises a second application role and a second BPM role. Moreover, in an embodiment, the process role integration procedure further comprises the following step of: generating a process role integration confirmation list.

Furthermore, in an embodiment, the integration device further comprises a network interface, and the network interface is electrically connected to the processor and is connected to an external server via a network. The external server stores the second database. The processor further accesses the second database from the external server via the network interface.

In addition to the aforesaid steps, the integration method of the present invention can also execute all the operations and have all the corresponding functions set forth in the aforesaid embodiments. How this embodiment executes these operations and has those functions will be readily appreciated by those of ordinary skill in the art based on the explanation of the aforesaid embodiments, and thus will not be further described herein.

According to the above descriptions, the integration method of the present invention integrates the artifacts of other databases into the local database, modifies application programming interfaces and processes of the integrated artifacts according to an access authority of each process role of the local database and an access authority of each process role of other databases, and finally integrates the process roles added from other databases into the local database with the process roles in the original local database according to access authority relationships of each user account. In this way, the present invention can remarkably reduce the complexity in introducing new management systems into the enterprises, thereby reducing the storage resources and the management resources required by the multiple management systems, and further enabling the processes of the management systems to correctly access the integrated database.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An integration device, comprising:
    a storage, being configured to store a first database, the first database comprising a plurality of first artifacts each of which has a first name; and
    a processor electrically connected to the storage, being configured to access the first database and a second database, the second database having a plurality of second artifacts therein, each of the second artifacts having a second name, wherein the processor further executes an artifact integration procedure comprising the following operations:
        (a) reading the first artifacts from the first database and the second artifacts from the second database;
        (b) analyzing a similarity between the first name of each of the first artifacts and the second name of each of the second artifacts based on a semantic analysis; and
        (c) for the first artifact and the second artifact of which the similarity is larger than a threshold, integrating the second artifact into the first artifact, and for any of the second artifacts that cannot be integrated, adding the second artifacts into the first database to update the first database;
    wherein the first database further comprises a plurality of first process roles each of which has a first access authority, the second database further comprises a plurality of second process roles each of which has a second access authority, the processor further adds the second process roles of the second database into the first database, and modifies a plurality of application programming interfaces (APIs) in the updated first database that are associated with the first artifacts and the second artifacts according to the first access authority of each of the first process roles and the second access authority of each of the second process roles and modifies an attribute of each of a plurality of processes according to the modified APIs;
    wherein the processor further executes a process role integration procedure to update the first database, the process role integration procedure comprising the following operations:
        (d) for each of the first process roles, determining an access authority intersection between the second access authorities of at least one of the second process roles, to which a plurality of first user accounts of the first process role relate, and when another access authority intersection between the first access authorities of at least one of the first process roles, to which a plurality of second user accounts of the second process role corresponding to the access authority intersection relate, corresponds to the first process role, integrating the first process role with the second process role corresponding to the access authority intersection; and
        (e) retaining in the first database any of the first process roles and any of the second process roles that cannot be integrated.

2. The integration device according to claim 1, wherein each of the first artifacts has a first API set and a first parameter set, each of the second artifacts has a second API set and a second parameter set, and the operation (c) of the artifact integration procedure further comprises the following operations:
    for the first artifact and the second artifact of which the similarity is larger than the threshold, determining whether at least one parameter of the second parameter set is not included in the first parameter set of the first artifact, and when the at least one parameter of the second parameter set is not included in the first parameter set of the first artifact, adding the at least one parameter into the first parameter set of the first artifact and revising the first API set of the first artifact according to the at least one parameter to update the first database.

3. The integration device according to claim 1, wherein each of the first process roles comprises a first application role and a first business process management (BPM) role, and each of the second process roles comprises a second application role and a second BPM role.

4. The integration device according to claim 1, wherein the processes are stored and run in one of the integration device, at least a server, and a combination thereof.

5. The integration device according to claim 1, further comprising:
    a network interface electrically connected to the processor, the network interface being connected to an external server via a network, the external server storing the second database therein, and the processor further accessing the second database from the external server via the network interface.

6. The integration device according to claim 1, wherein the storage is further configured to store the second database.

7. The integration device according to claim 1, wherein each of the first artifacts of the first database further comprises a first instance identifier (ID), and the operation (c) of the artifact integration procedure further comprises the following operations:
    for any of the second artifacts that cannot be integrated and that are added into the first database, adding a first instance ID and filling the first instance ID into the second artifact.

8. The integration device according to claim 1, wherein the operation (c) of the artifact integration procedure further comprises the following operation:
    for the first artifact and the second artifact of which the similarity is larger than the threshold, sealing up the second artifact.

9. The integration device according to claim 1, wherein the artifact integration procedure further comprises the following operation:
    generating an artifact integration confirmation list.

10. The integration device according to claim 1, wherein the process role integration procedure further comprises the following operation:
    generating a process role integration confirmation list.

11. An integration method for an integration device, the integration device comprising a storage and a processor, the storage storing a first database, the first database comprising a plurality of first artifacts each of which has a first name, the processor being electrically connected to the storage and configured to access the first database and a second database, the second database having a plurality of second artifacts therein, each of the second artifacts having a second name, the integration method being executed by the processor and comprising the following steps:

executing an artifact integration procedure which comprises the following steps:
(a) reading the first artifacts from the first database and the second artifacts from the second database;
(b) analyzing a similarity between the first name of each of the first artifacts and the second name of each of the second artifacts based on a semantic analysis; and
(c) for the first artifact and the second artifact of which the similarity is larger than a threshold, integrating the second artifact into the first artifact, and for any of the second artifacts that cannot be integrated, adding the second artifacts into the first database to update the first database;

wherein the first database further comprises a plurality of first process roles each of which has a first access authority, the second database further comprises a plurality of second process roles each of which has a second access authority, the integration method further comprising the following steps of:

adding the second process roles of the second database into the first database;
modifying a plurality of application programming interfaces (APIs) in the updated first database that are associated with the first artifacts and the second artifacts according to the first access authority of each of the first process roles and the second access authority of each of the second process roles;
modifying an attribute of each of a plurality of processes according to the modified APIs; and
executing a process role integration procedure to update the first database, the process role integration procedure comprising the following steps:
(d) for each of the first process roles, determining an access authority intersection between the second access authorities of at least one of the second process roles, to which a plurality of first user accounts of the first process role relate, and when another access authority intersection between the first access authorities of at least one of the first process roles, to which a plurality of second user accounts of the second process role corresponding to the access authority intersection relate, corresponds to the first process role, integrating the first process role with the second process role corresponding to the access authority intersection; and
(e) retaining in the first database any of the first process roles and any of the second process roles that cannot be integrated.

12. The integration method according to claim 11, wherein each of the first artifacts has a first API set and a first parameter set, each of the second artifacts has a second API set and a second parameter set, and the step (c) of the artifact integration procedure further comprises the following operations:

for the first artifact and the second artifact of which the similarity is larger than the threshold, determining whether at least one parameter of the second parameter set is not included in the first parameter set of the first artifact, and when the at least one parameter of the second parameter set is not included in the first parameter set of the first artifact, adding the at least one parameter into the first parameter set of the first artifact and revising the first API set of the first artifact according to the at least one parameter to update the first database.

13. The integration method according to claim 11, wherein each of the first process roles comprises a first application role and a first business process management (BPM) role, and each of the second process roles comprises a second application role and a second BPM role.

14. The integration method according to claim 11, wherein the processes are stored and run in one of the integration device, at least a server, and a combination thereof.

15. The integration method according to claim 11, wherein the integration device further comprises a network interface, the network interface is electrically connected to the processor and is connected to an external server via a network, the external server stores the second database, and the processor further accesses the second database from the external server via the network interface.

16. The integration method according to claim 11, wherein the storage is further configured to store the second database.

17. The integration method according to claim 11, wherein each of the first artifacts of the first database further comprises a first instance identifier (ID), and the step (c) of the artifact integration procedure further comprises the following step:

for any of the second artifacts that cannot be integrated and that are added into the first database, adding a first instance ID and filling the first instance ID into the second artifact.

18. The integration method according to claim 11, wherein the step (c) of the artifact integration procedure further comprises the following step:

for the first artifact and the second artifact of which the similarity is larger than the threshold, sealing up the second artifact.

19. The integration method according to claim 11, wherein the artifact integration procedure further comprises the following step:

generating an artifact integration confirmation list.

20. The integration method according to claim 11, wherein the process role integration procedure further comprises the following step:

generating a process role integration confirmation list.

* * * * *